United States Patent
Hason

(10) Patent No.: US 10,979,789 B1
(45) Date of Patent: Apr. 13, 2021

(54) WAVELENGTH-BASED UPLINK RANDOM ACCESS IN AN OPTICAL COMMUNICATIONS NETWORK FOR A WIRELESS COMMUNICATIONS SYSTEM (WCS)

(71) Applicant: Corning Research & Development Corporation, Corning, NY (US)

(72) Inventor: Baruh Hason, Tel Aviv (IL)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/901,135

(22) Filed: Jun. 15, 2020

(51) Int. Cl.
*H04Q 11/00* (2006.01)
*H04W 74/08* (2009.01)

(52) U.S. Cl.
CPC ..... *H04Q 11/0067* (2013.01); *H04Q 11/0005* (2013.01); *H04W 74/0833* (2013.01); *H04Q 2011/0015* (2013.01); *H04Q 2011/0016* (2013.01)

(58) Field of Classification Search
CPC ........... H04Q 11/0067; H04Q 11/0005; H04Q 2011/0015; H04Q 2011/0016; H04W 74/0833
USPC .......................................................... 398/67
See application file for complete search history.

(56) References Cited

U.S. PATENT DOCUMENTS

| 8,724,993 | B2 | 5/2014 | Osugi | |
|---|---|---|---|---|
| 9,642,094 | B1* | 5/2017 | Harel | H04W 52/242 |
| 2014/0233383 | A1* | 8/2014 | Naaman | H04L 47/10 370/235 |
| 2017/0111137 | A1* | 4/2017 | Gao | H04B 10/27 |
| 2019/0386743 | A1* | 12/2019 | Yin | H04Q 11/00 |
| 2020/0092622 | A1* | 3/2020 | Oh | H04L 47/6275 |

FOREIGN PATENT DOCUMENTS

| CN | 104956627 A | 9/2015 |
|---|---|---|
| JP | 2014-165634 A | 9/2014 |

* cited by examiner

*Primary Examiner* — Dalzid E Singh
(74) *Attorney, Agent, or Firm* — C. Keith Montgomery

(57) ABSTRACT

Wavelength-based random access in an optical communications network for a wireless communications system (WCS) is disclosed. An optical network unit(s) (ONU(s)) is configured to generate a random access signal comprising an unsolicited buffer occupancy (BO) report to request uplink allocation as soon as the ONU(s) receives a non-periodic uplink data burst. The ONU(s) then sends an optical random access signal including the unsolicited BO report to an optical line terminator (OLT) based on a random access wavelength, which is so determined not to cause any interference with a downlink optical communications signal(s) and an uplink optical communications signal(s) being regularly communicated between the OLT and the ONU(s). As a result, it is possible to reduce access delay at the ONU(s) for sending the non-periodic uplink data burst without requiring frequent polling from the OLT, thus helping to reduce signaling overhead and improve throughput of the optical communications network.

30 Claims, 13 Drawing Sheets

GENERATE AN OPTICAL RANDOM ACCESS SIGNAL (412) COMPRISING A UNSOLICITED BUFFER OCCUPANCY (BO) REPORT ($R_{BO}$) IN RESPONSE TO RECEIVING A NON-PERIODIC UPLINK DATA BURST (414)
502

PROVIDE THE OPTICAL RANDOM ACCESS SIGNAL (412) TO AN OPTICAL LINE TERMINATOR (OLT) (402) BASED ON A RANDOM ACCESS WAVELENGTH ($\lambda_{RA}$) DIFFERENT FROM A DOWNLINK WAVELENGTH ($\lambda_{DL}$) FOR RECEIVING A DOWNLINK OPTICAL COMMUNICATIONS SIGNAL (416D) FROM THE OLT (402) AND AN UPLINK WAVELENGTH ($\lambda_{UL}$) FOR PROVIDING AN UPLINK OPTICAL COMMUNICATIONS SIGNAL (416U) TO THE OLT (402)
504

WAVELENGTH-BASED UPLINK RANDOM ACCESS IN AN OPTICAL COMMUNICATIONS NETWORK FOR A WIRELESS COMMUNICATIONS SYSTEM (WCS)

BACKGROUND

The disclosure relates generally to an optical communications network provided in a wireless communications system (WCS), such as a distributed communications system (DCS), configured to support wavelength-based uplink random access.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell radio access network (RAN) or distributed antenna system (DAS). DCSs include a central unit or node that is configured to transmit or distribute communications signals to remote units typically over physical mediums, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive RF signals from a source.

In this regard, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Because the remote units 106(1)-106(N) include components that require power to operate, such as the RF transmitters/receivers 116(1)-116(N) for example, it is necessary to provide power to the remote units 106(1)-106(N). In one example, each remote unit 106(1)-106(N) may receive power from a local power source. In another example, the remote units 106(1)-106(N) may be powered remotely from a remote power source(s). For example, the central unit 108 in the WCS 100 in FIG. 1 includes a power source 122 that is configured to remotely supply power over the communications links 114 to the remote units 106(1)-106(N). For example, the communications links 114 may be cable that includes electrical conductors for carrying current (e.g., direct current (DC)) to the remote units 106(1)-106(N).

If the WCS 100 is an optical fiber-based DCS, the central unit 108 can be coupled to the remote units 106(1)-106(N) via an optical communications network 124, such as a passive optical network (PON). In this regard, the communications links 114 may by a "hybrid" cable that includes optical fibers for carrying the downlink and uplink communications signals 112D, 112U and separate electrical conductors for carrying current to the remote units 106(1)-106(N).

No admission is made that any reference cited herein constitutes prior art. Applicant expressly reserves the right to challenge the accuracy and pertinency of any cited documents.

SUMMARY

Embodiments disclosed herein include wavelength-based uplink random access in an optical communications network for a wireless communications system (WCS). In a non-limiting example, the optical communications network can be a passive optical network (PON). In a conventional PON, when an optical network unit (ONU) has an uplink data burst to send to an optical line terminator (OLT), the ONU needs to await a periodic polling from the OLT to send a buffer occupancy (BO) report and receive an uplink allocation for communicating the uplink data burst. Notably, if the OLT sends the periodic polling frequently, throughput of the optical communications network can be reduced as a result of increased signaling overhead. In contrast, if the OLT sends the periodic polling infrequently, the ONU can suffer an increased access delay in sending the uplink data burst.

In this regard, in embodiments disclosed herein, an ONU(s) is configured to generate a random access signal comprising an unsolicited BO report to request an uplink allocation as soon as the ONU(s) receives a non-periodic uplink data burst. The ONU(s) then sends an optical random access signal including the unsolicited BO report to the OLT based on a random access wavelength. Specifically, the random access wavelength is so determined not to cause any interference with a downlink optical communications signal(s) and an uplink optical communications signal(s) being regularly communicated between the OLT and the ONU(s). As a result, it is possible to reduce access delay at the ONU(s) for sending the non-periodic uplink data burst without requiring frequent polling from the OLT, thus helping to improve throughput of the optical communications network.

One exemplary embodiment of the disclosure relates to an optical communications network. The optical communications network includes an OLT. The OLT is configured to communicate a downlink optical communications signal based on a downlink wavelength. The OLT is also configured to communicate an uplink optical communications signal based on an uplink wavelength different from the downlink wavelength. The optical communications network also includes a plurality of ONUs coupled to the OLT. At least one ONU among the plurality of ONUs includes a processing circuit configured to generate a random access signal comprising an unsolicited BO report in response to receiving a non-periodic uplink data burst. The at least one ONU also includes an ONU interface. The ONU interface is configured to convert the random access signal into an optical random access signal comprising the unsolicited BO report. The ONU interface is also configured to provide the optical random access signal to the OLT based on a random access wavelength different from the downlink wavelength and the uplink wavelength.

An additional exemplary embodiment of the disclosure relates to a method for supporting wavelength-based uplink random access in an optical communications network for a WCS. The method includes generating an optical random access signal comprising an unsolicited BO report in response to receiving a non-periodic uplink data burst. The method also includes providing the optical random access signal to an OLT based on a random access wavelength different from a downlink wavelength for receiving a downlink optical communications signal from the OLT and an uplink wavelength for providing an uplink communications signal to the OLT.

An additional exemplary embodiment of the disclosure relates to a WCS. The WCS includes an optical communications network. The optical communications network includes an OLT. The OLT is configured to communicate a downlink optical communications signal based on a downlink wavelength. The OLT is also configured to communicate an uplink optical communications signal based on an uplink wavelength different from the downlink wavelength. The optical communications network also includes a plurality of ONUs coupled to the OLT. At least one ONU among the plurality of ONUs includes a processing circuit configured to generate a random access signal comprising an unsolicited BO report in response to receiving a non-periodic uplink data burst. The at least one ONU also includes an ONU interface. The ONU interface is configured to convert the random access signal into an optical random access signal comprising the unsolicited BO report. The ONU interface is also configured to provide the optical random access signal to the OLT based on a random access wavelength different from the downlink wavelength and the uplink wavelength.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include wavelength-based uplink random access in an optical communications network for a wireless communications system (WCS). In a non-limiting example, the optical communications network can be a passive optical network (PON). In a conventional PON, when an optical network unit (ONU) has an uplink data burst to send to an optical line terminator (OLT), the ONU needs to await a periodic polling from the OLT to send a buffer occupancy (BO) report and receive an uplink allocation for communicating the uplink data burst. Notably, if the OLT sends the periodic polling frequently, throughput of the optical communications network can be reduced as a result of increased signaling overhead. In contrast, if the OLT sends the periodic polling infrequently, the ONU can suffer an increased access delay in sending the uplink data burst.

In this regard, in embodiments disclosed herein, an ONU(s) is configured to generate a random access signal comprising an unsolicited BO report to request uplink allocation as soon as the ONU(s) receives a non-periodic uplink data burst. The ONU(s) then sends an optical random access signal including the unsolicited BO report to the OLT based on a random access wavelength. Specifically, the random access wavelength is so determined not to cause any interference with a downlink optical communications signal(s) and an uplink optical communications signal(s) being regularly communicated between the OLT and the ONU(s). As a result, it is possible to reduce access delay at the ONU(s) for sending the non-periodic uplink data burst without requiring frequent polling from the OLT, thus helping to improve throughput of the optical communications network.

Figure 1:
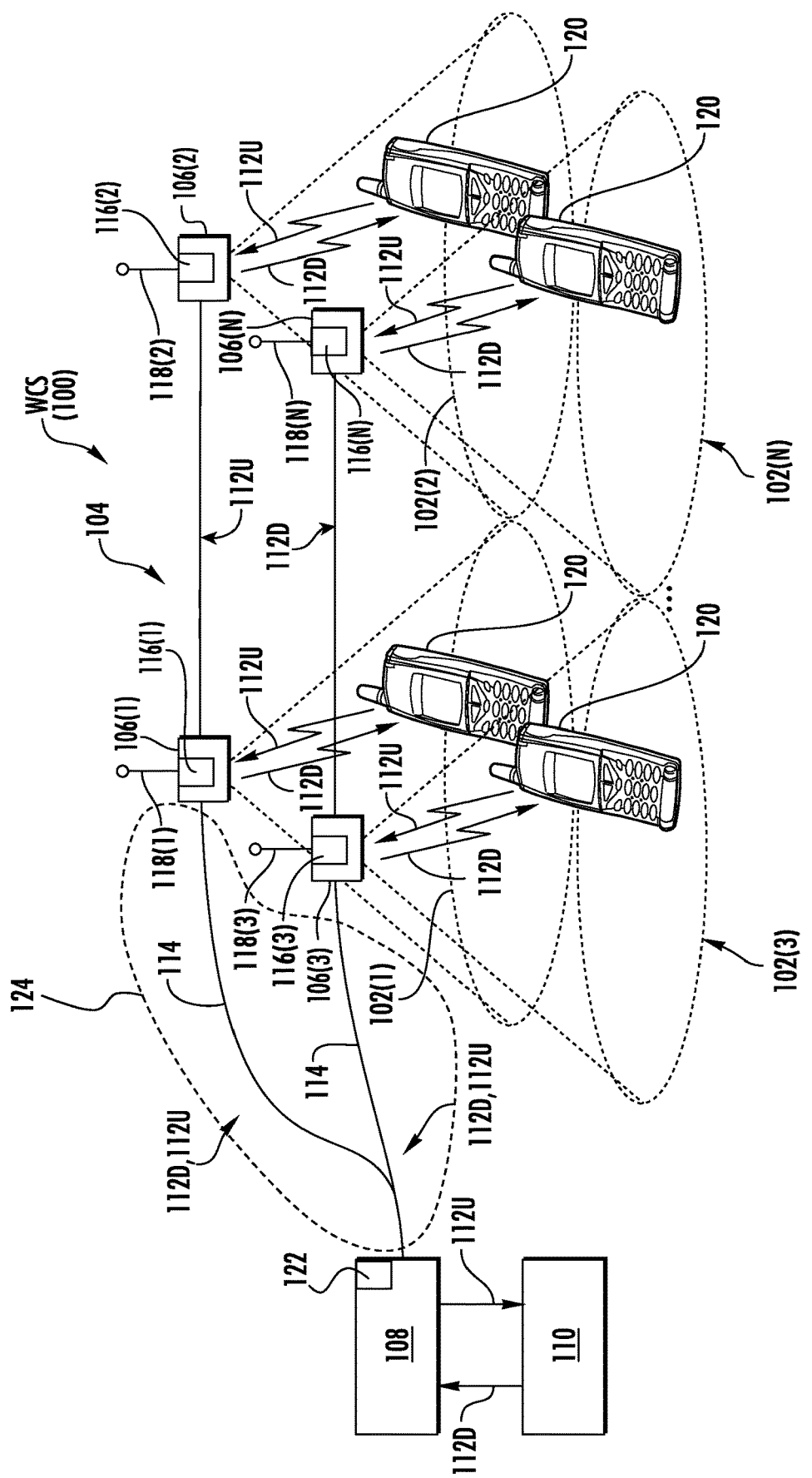
FIG. 1 is a schematic diagram of an exemplary wireless communications system (WCS), such as a distributed communications system (DCS), configured to distribute communications services to remote coverage areas.
Figure 2:
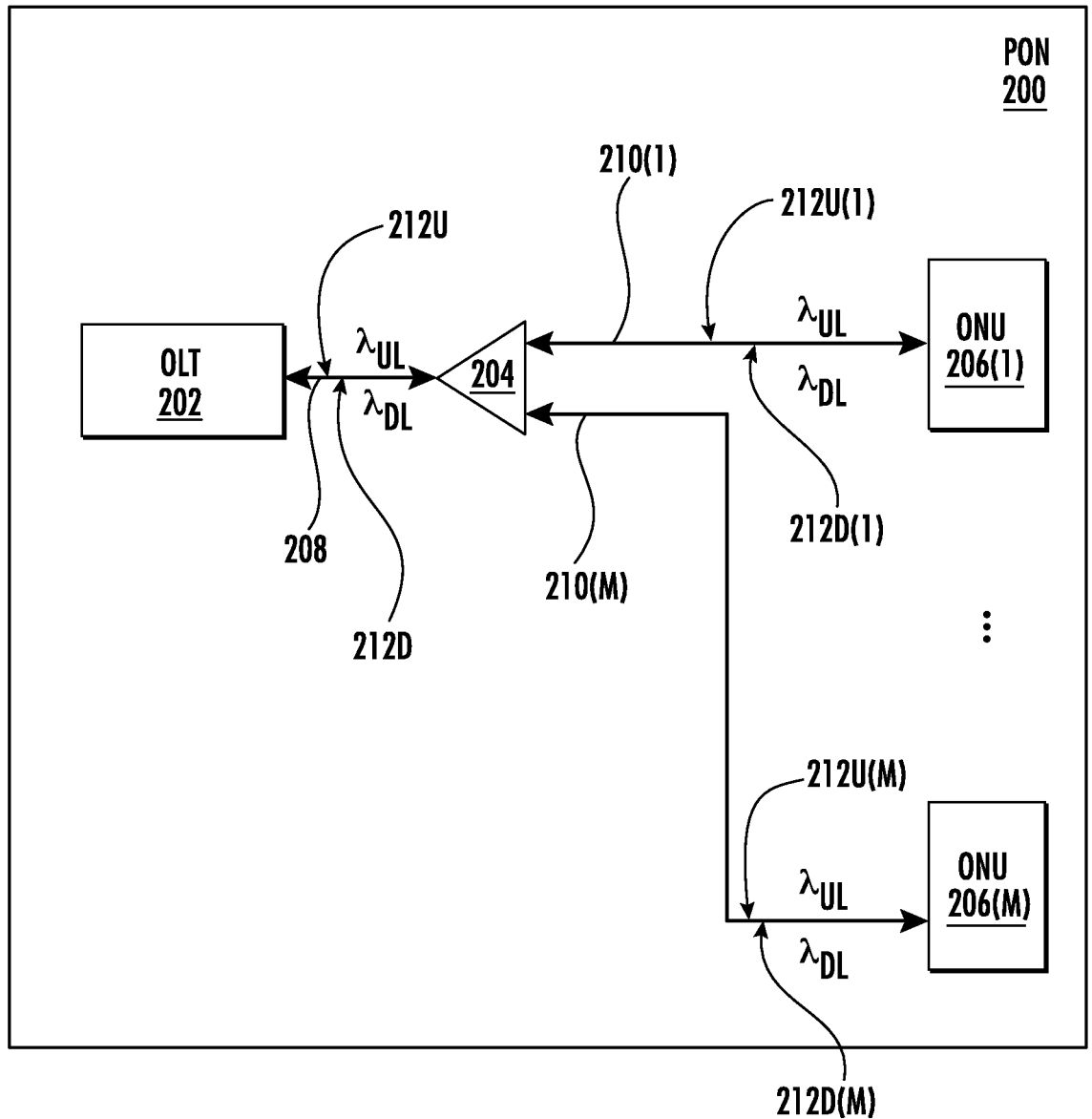
FIG. 2 is a schematic diagram of a conventional passive optical network (PON)
Figure 3B:
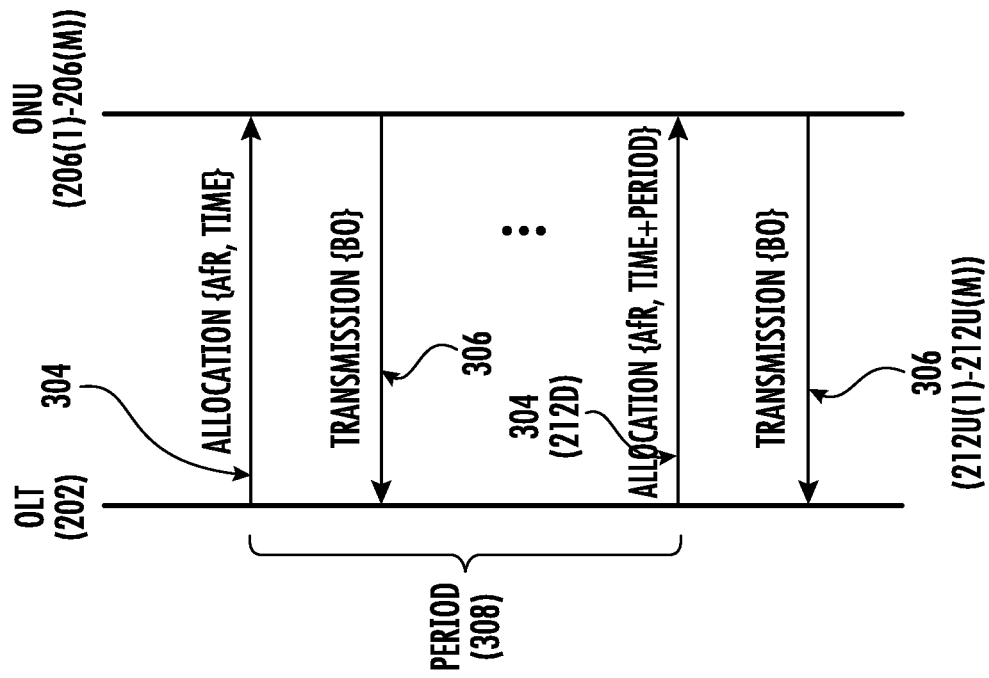
FIG. 3B is a flow diagram illustrating an exemplary signal flow of polling-based uplink allocation in the PON of FIG. 2.
Figure 3A:
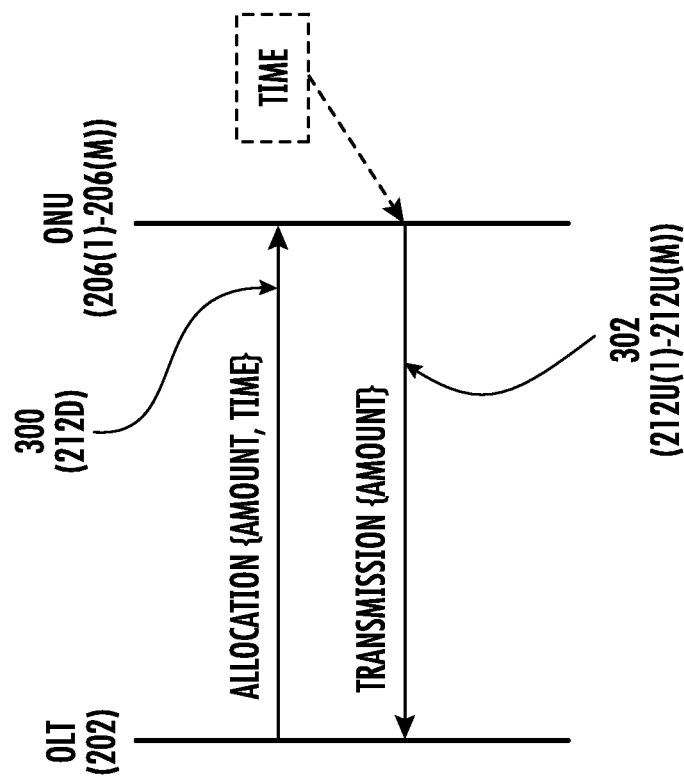
FIG. 3A is a flow diagram illustrating an exemplary signal flow of uplink allocation in the PON of FIG. 2.
Figure 4A:
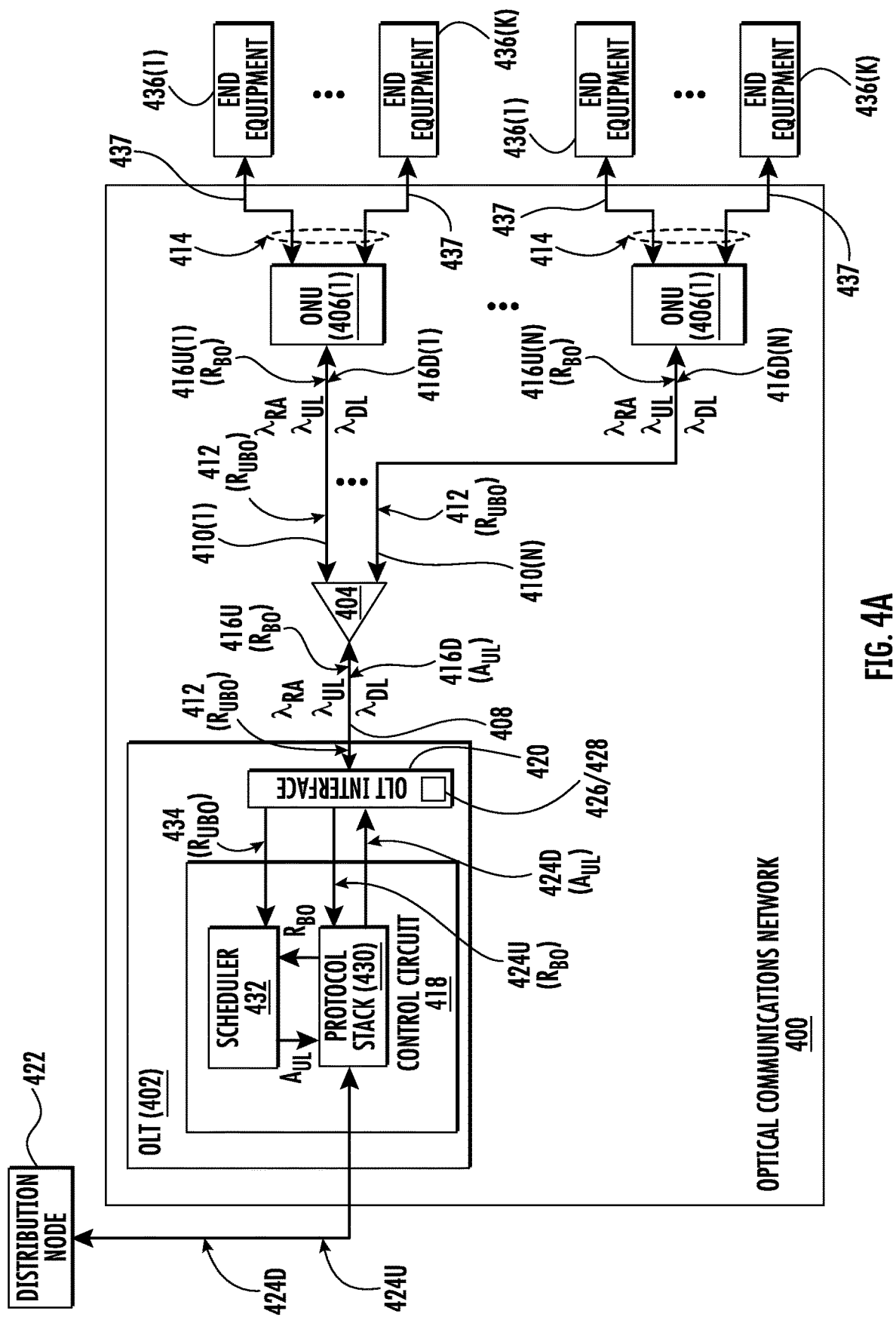
FIG. 4A is a schematic diagram of an exemplary optical communications network configured to support wavelength-based uplink random access.

Before discussing an optical communications network in a WCS that supports wavelength-based random access of the present disclosure, starting at FIG. 4A, a brief discussion is first provided with references to FIGS. 2, 3A, and 3B to help understand issues related to communicating a non-periodic uplink data burst in a conventional PON.

In this regard, FIG. 2 is a schematic diagram of a conventional PON 200. The conventional PON 200 includes at least one OLT 202, a passive optical splitter 204, and a plurality of ONUs 206(1)-206(M). The OLT 202 is coupled to the passive optical splitter 204 via a first optical fiber-based communications medium 208. The passive optical splitter 204 is coupled to the ONUs 206(1)-206(M) via a plurality of second optical fiber-based communications mediums 210(1)-210(M). Although the conventional PON 200 is shown to include only the OLT 202, it should be appreciated that the conventional PON 200 can include additional OLTs each coupled to respective ONUs via a respective passive optical splitter. Herein, the OLT 202 is an optical-electrical device that is typically provided in a central office to serve as an interface between the conventional PON 200 and a distribution node(s). Each of the ONUs 206(1)-206(M) can be an optical-electrical device that is typically provided in a user premises to serve as an interface between the conventional PON 200 and subscribers. The passive optical splitter 204, on the other hand, is a branching tree of optical fibers that couples the OLT 202 to the ONUs 206(1)-206(M).

The conventional PON 200 is said to be passive because the passive optical splitter 204 operates entirely in an optical domain (as opposed to operating in an electrical domain or a digital domain) without requiring a power supply. The conventional PON 200 can be configured to support a Gigabit PON (GPON) standard or an Ethernet PON (EPON) standard. Both the GPON and the EPON standards define a similar OLT-ONU topology as shown in the conventional PON 200.

In downlink, the OLT 202 can communicate a downlink optical communications signal 212D to the passive optical splitter 204 based on a downlink wavelength $\lambda_{DL}$. The passive optical splitter 204 splits the downlink optical communications signal 212D into a plurality of downlink optical communications signals 212D(1)-212D(M). Each of the downlink optical communications signals 212D(1)-212D(M) is replica of the downlink optical communications signal 212D and corresponds to the downlink wavelength $\lambda_{DL}$. The ONUs 206(1)-206(M) receive the downlink optical communications signals 212D(1)-212D(M) based on the downlink wavelength $\lambda_{DL}$ over the second optical fiber-based communications mediums 210(1)-210(M). Each of the ONUs 206(1)-206(M) can include an optical-to-electrical (O/E) converter(s) (not shown) to convert a respective one of the downlink optical communications signals 212D(1)-212D(M) to a respective downlink electrical communications signal. Each of the ONUs 206(1)-206(M) may also include an analog-to-digital converter(s) (ADC(s)) (not shown) to convert the respective downlink electrical communications signal into a respective downlink digital communications signal. Accordingly, each of the ONUs 206(1)-206(M) can distribute the respective downlink electrical communications signal or the respective downlink digital communications signal to an external destination(s).

In uplink, the ONUs 206(1)-206(M) provide a plurality of uplink optical communications signals 212U(1)-212U(M) to the passive optical splitter 204 based on an uplink wavelength $\lambda_{UL}$ over the second optical fiber-based communications mediums 210(1)-210(M). Each of the ONUs 206(1)-206(M) may receive a respective uplink digital communications signal from an external source(s). In this regard, each of the ONUs 206(1)-206(M) can include a digital-to-analog converter(s) (DAC(s)) (not shown) to convert the respective uplink digital communications signal into a respective uplink electrical communications signal. Each of the ONUs 206(1)-206(M) can also include an electrical-to-optical (E/O) converter(s) to convert the respective uplink electrical communications signal into a respective one of the uplink optical communications signals 212U(1)-212U(M). The passive optical splitter 204 combines the uplink optical communications signals 212U(1)-212U(M) into an uplink optical communications signal 212U. The OLT 202 receives the uplink optical communications signal 212U based on the uplink wavelength $\lambda_{UL}$ over the first optical fiber-based communications medium 208. Each of the ONUs 206(1)-206(M) is required to obtain an uplink allocation from the OLT 202 before providing a respective one of the uplink optical communications signals 212U(1)-212U(M) to the OLT 202. In this regard, FIG. 3A is a flow diagram illustrating an exemplary signal flow of uplink allocation in the conventional PON 200 of FIG. 2.

As illustrated in FIG. 3A, the OLT 202 provides an uplink allocation 300, which can be piggy-backed on the downlink optical communications signal 212D, to any of the ONUs

206(1)-206(M). The uplink allocation 300 can include an indication of an uplink packet size (denoted as "AMOUNT") and a time duration allocated for uplink transmission (denoted as "TIME"). In response to receiving the uplink allocation 300, a respective one of the ONUs 206(1)-206(M) can make an uplink transmission 302 in a respective one of the uplink optical communications signals 212U(1)-212U(M). The uplink transmission 302 can include an indication of the uplink packet size (denoted as "AMOUNT").

From time to time, any of the ONUs 206(1)-206(M) may need to send an ONU-originated uplink data burst to the OLT. In this regard, the ONUs 206(1)-206(M) need to request an uplink allocation for communicating the ONU-originated uplink data burst to the OLT 202. In this regard, FIG. 3B is a flow diagram illustrating an exemplary signal flow of polling-based uplink allocation in the conventional PON 200 of FIG. 2

Any of the ONUs 206(1)-206(M) can employ a data buffer, such as a First-in First-out (FIFO) buffer, to store the ONU-originated uplink data burst while awaiting an initial uplink allocation for sending the ONU-originated uplink data burst to the OLT 202. The OLT 202 provides a polling signal 304 to the ONUs 206(1)-206(M). The polling signal 304 includes an uplink allocation for one of the ONUs 206(1)-206(M) to send a BO report 306 to report an amount of the ONU-originated uplink data burst stored in the data buffer. Based on the BO report 306, the OLT 202 can make the initial uplink allocation (e.g., the uplink allocation 300 in FIG. 3A), which can be piggy-backed on the downlink optical communications signal 212D, for any of the ONUs 206(1)-206(M) to send the ONU-originated uplink data burst. Once the ONUs 206(1)-206(M) have obtained the initial uplink allocation, the ONUs 206(1)-206(M) can piggy-back a subsequent BO report 306 in the uplink optical communications signals 212U(1)-212U(M) (e.g., the uplink transmission 302 in FIG. 3A) to solicit for subsequent uplink allocation for sending the remaining or newly arriving ONU-originated uplink data burst.

The OLT 202 can be configured to provide the polling signal 304 based on a period 308. In other words, the polling signal 304 is repeated periodically. Understandably, the shorter the period 308, the more frequent the polling signal 304 will be provided, and therefore the faster the ONUs 206(1)-206(M) can obtain the uplink BO allocation for sending the BO report 306. However, sending the polling signal 304 too frequently from the OLT 202 may reduce overall data throughput of the conventional PON 200 as a result of increased signaling overhead. In contrast, sending the polling signal 304 infrequently from the OLT 202 may compromise user experience due to increased access delay of the ONUs 206(1)-206(M). Hence, it may be desired to reduce access delay of the ONUs 206(1)-206(M) without compromising data throughput of the conventional PON 200.

In this regard, FIG. 4A is a schematic diagram of an exemplary optical communications network 400 configured to support wavelength-based uplink random access. The optical communications network 400 includes an OLT 402, a passive optical splitter 404, and a plurality of ONUs 406(1)-406(N). The OLT 402 is coupled to the passive optical splitter 404 via a first optical fiber-based communications medium 408. The passive optical splitter 404 is coupled to the ONUs 406(1)-406(N) via a plurality of second optical fiber-based communications mediums 410(1)-410(N), respectively. In a non-limiting example, the optical communications network 400 can be a PON configured to operate based on any established PON standard and/or architecture, including but not limited to GPON, EPON, XG-PON, XGS-PON, NG-PON, and 10G-EPON. In this regard, the optical communications network 400 operates entirely in an optical domain (as opposed to operating in an electrical domain or a digital domain) and does not require a power supply.

As discussed in detail below, the optical communications network 400 is configured to reduce initial access delay for communicating a non-periodic uplink data burst (e.g., a best-effort data burst) from any of the ONUs 406(1)-406(N) to the OLT 402 without compromising overall data throughput of the optical communications network 400. More specifically, any of the ONUs 406(1)-406(N) can be configured to communicate an optical random access signal 412, which includes an unsolicited BO report $R_{UBO}$, based on a random access wavelength $\lambda_{RA}$ as soon as a first data packet of the non-periodic uplink data burst 414 (e.g., a best-effort data burst) is received. In response to receiving the unsolicited BO report $R_{UBO}$, the OLT 402 may return an uplink allocation $A_{UL}$ for any of the ONUs 406(1)-406(N) to communicate the non-periodic uplink data burst 414 in a timely fashion. As such, the ONUs 406(1)-406(N) no longer have to wait for a polling signal, such as the polling signal 304 in FIG. 3B, from the OLT 402 to communicate a BO report. As a result, it is possible to reduce the initial access delay for communicating the non-periodic uplink data burst 414 from any of the ONUs 406(1)-406(N) to the OLT 402. In turn, the OLT 402 is able to provide the polling signal at a reduced frequency, thus helping to free up more bandwidth to boost overall data throughput of the optical communications network 400.

In the optical communications network 400, the OLT 402 is configured to provide a downlink optical communications signal 416D to the passive optical splitter 404 via the first optical fiber-based communications medium 408 based on a downlink wavelength $\lambda_{DL}$. The passive optical splitter 404 splits the downlink optical communications signal 416D into a plurality of downlink optical communications signals 416D(1)-416D(N). In this regard, each of the downlink optical communications signals 416D(1)-416D(N) can be seen as a replica of the downlink optical communications signal 416D. Accordingly, each of the ONUs 406(1)-406(N) receives the downlink optical communications signal 416D from the OLT 402 by receiving a respective one of the downlink optical communications signals 416D(1)-416D(N) based on the downlink wavelength $\lambda_{DL}$ over a respective one of the second optical fiber-based communications mediums 410(1)-410(N).

In the optical communications network 400, the ONUs 406(1)-406(N) provide a plurality of uplink optical communications signals 416U(1)-416U(N) to the passive optical splitter 404 over the second optical fiber-based communications mediums 410(1)-410(N) based on an uplink wavelength $\lambda_{UL}$. Given that the second optical fiber-based communications mediums 410(1)-410(N) carry both the downlink optical communications signals 416D(1)-416D(N) and the uplink optical communications signals 416U(1)-416U(N), the uplink wavelength $\lambda_{UL}$ is different from the downlink wavelength $\lambda_{DL}$ to make it possible to separate the downlink optical communications signals 416D(1)-416D(N) from the uplink optical communications signals 416U(1)-416U(N). The passive optical splitter 404 combines the uplink optical communications signals 416U(1)-416U(N) into an uplink optical communications signal 416U having the same uplink wavelength $\lambda_{UL}$. Accordingly, the OLT 402 receives the uplink optical communications signal 416U based on the uplink wavelength $\lambda_{UL}$ over the first optical fiber-based communications medium 408.

Each of the ONUs 406(1)-406(N) can provide the optical random access signal 412 to the passive optical splitter 404 over a respective one of the second optical fiber-based communications mediums 410(1)-410(N). In a non-limiting example, one of the ONUs 406(1)-406(N) can multiplex the optical random access signal 412 with a respective one of the uplink optical communications signals 416U(1)-416U(N) based on the random access wavelength $\lambda_{RA}$. Accordingly, the OLT 402 can receive both the optical random access signal 412 and the uplink optical communications signal 416U via the first optical fiber-based communications medium 408. In this regard, the random access wavelength $\lambda_{RA}$ must be different from the uplink wavelength $\lambda_{UL}$ such that the OLT 402 can separate the optical random access signal 412 from the uplink optical communications signal 416U. Further, since the first optical fiber-based communications medium 408 also carries the downlink optical communications signal 416D, the random wavelength $\lambda_{RA}$ must also be different from the downlink wavelength $\lambda_{DL}$. Hence, the random access wavelength $\lambda_{RA}$ must be so determined to differ from the downlink wavelength $\lambda_{DL}$ and the uplink wavelength $\lambda_{UL}$.

Figure 5:
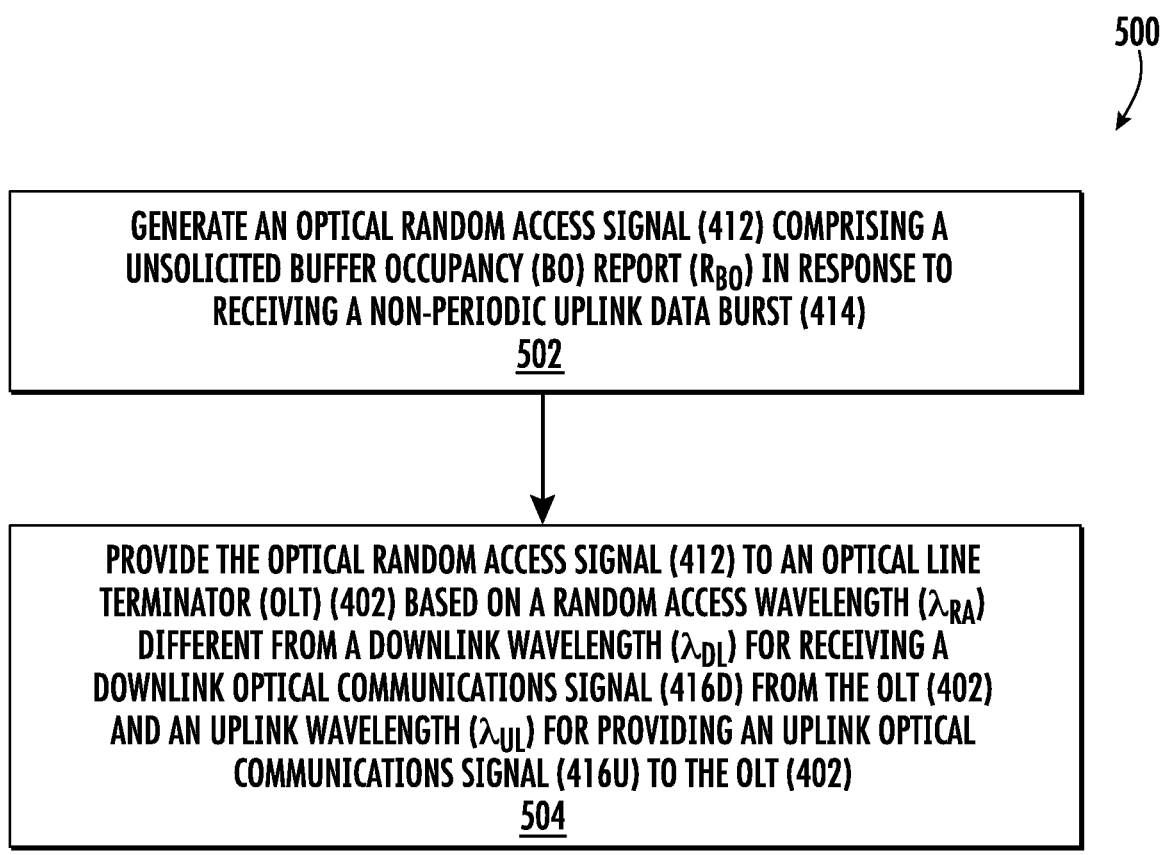
FIG. 5 is a flowchart of an exemplary process that can be employed by the optical communications network of FIG. 4A to support the wavelength-based uplink random access.

The optical communications network 400 can be configured to support wavelength-based uplink random access based on a process. In this regard, FIG. 5 is a flowchart of an exemplary process 500 that can be employed by the optical communications network 400 of FIG. 4A to support the wavelength-based uplink random access.

By employing the process 500, any of the ONUs 406(1)-406(N) can generate the optical random access signal 412, which includes the unsolicited BO report $R_{UBO}$, in response to receiving the non-periodic uplink data burst 414 (block 502). Accordingly, any of the ONUs 406(1)-406(N) can provide the optical random access signal 412 to the OLT 402 based on the random access wavelength $\lambda_{RA}$ that is different from the downlink wavelength $\lambda_{DL}$ for receiving the downlink optical communications signal 416D from the OLT 402 and the uplink wavelength $\lambda_{UL}$ for providing the uplink optical communications signal 416U to the OLT 402 (block 504).

With reference back to FIG. 4A, the OLT 402 can be configured to include a control circuit 418, which can be a field-programmable gate array (FPGA) as an example, and an OLT interface 420. The control circuit 418 can be coupled to a distribution node 422. The distribution node 422 can be a digital baseband unit (DBBU) and configured to communicate a downlink communications signal 424D and an uplink communications signal 424U with the control circuit 418 based on Common Public Radio Interface (CPRI) protocol.

The OLT interface 420 can include an E/O converter(s) 426 and an O/E converter(s) 428. The E/O converter(s) 426 converts the downlink communications signal 424D into the downlink optical communications signal 416D. The O/E converter(s) 428 converts the uplink optical communications signal 416U into the uplink communications signal 424U. In a non-limiting example, the control circuit 418 can implement a protocol stack 430 and a scheduler 432. The protocol stack 430 may support both the CPRI protocol and the PON protocol (e.g., GPON protocol or EPON protocol). The scheduler 432 may determine downlink and/or uplink allocations for the ONUs 406(1)-406(N). As such, the control circuit 418 can generate, transmit, receive, and schedule data communications based on different networking protocols (e.g., CPRI, GPON, EPON, etc.). As a result, the OLT 402 can bridge data communications between the distribution node 422 and the ONUs 406(1)-406(N).

To support the wavelength-based uplink random access, the O/E converter(s) 428 separates the optical random access signal 412 from the uplink optical communications signal 416U based on the random access wavelength $\lambda_{RA}$ and converts the optical random access signal 412 into a random access signal 434 that includes the unsolicited BO report $R_{UBO}$. The scheduler 432 receives the random access signal 434 from the OLT interface 420 and determines the uplink allocation $A_{UL}$ based on the unsolicited BO report $R_{UBO}$ carried in the random access signal 434. The scheduler 432 provides the uplink allocation $A_{UL}$ to the protocol stack 430, which in turn piggy-backs the uplink allocation $A_{UL}$ in the downlink communications signal 424D. In this regard, when the E/O converter(s) 426 converts the downlink communications signal 424D into the downlink optical communications signal 416D, the downlink optical communications signal 416D will also carry the uplink allocation $A_{UL}$.

Each of the ONUs 406(1)-406(N) can be configured to communicate with one or more end equipment 436(1)-436(K) via an electrical cable 437 (e.g., coaxial cable, twisted-pair cable, etc.). In a non-limiting example, the end equipment 436(1)-436(K) can include a remote unit(s) (e.g., radio head, femtocell base station, Wi-Fi access point, etc.) and/or a data unit(s) (e.g., desktop computer, laptop computer, printer, etc.). In this regard, each of the end equipment 436(1)-436(K) can trigger the non-periodic uplink data burst 414 and provide the non-periodic uplink data burst 414 to any of the ONUs 406(1)-406(N).

Figure 4B:
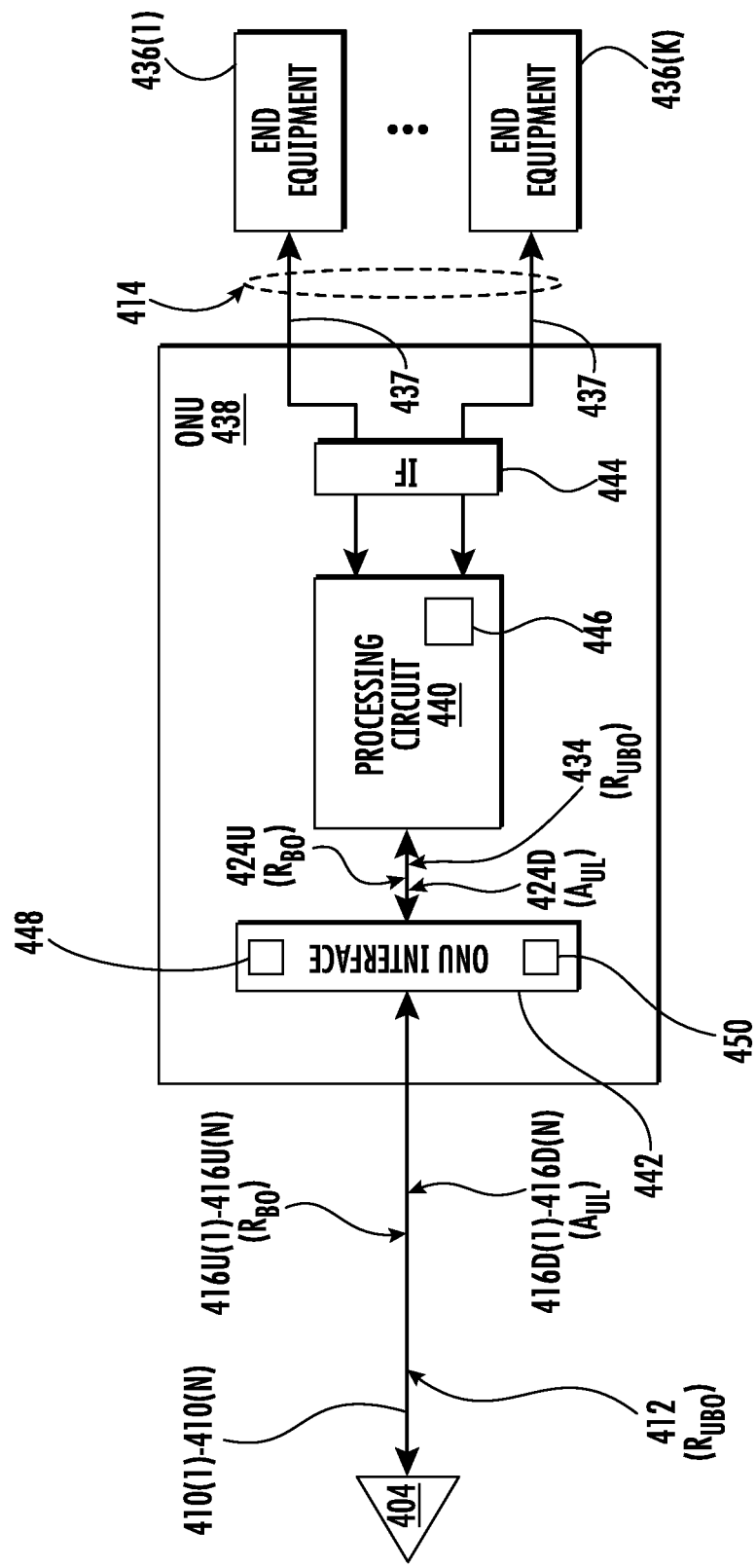
FIG. 4B is a schematic diagram of an exemplary optical network unit (ONU) that can be provided in the optical communications network of FIG. 4A to support the wavelength-based uplink random access.

FIG. 4B is a schematic diagram of an exemplary ONU 438 that can be provided in the optical communications network of FIG. 4A as any of the ONUs 406(1)-406(N) and configured to support the wavelength-based uplink random access as described above. Common elements between FIGS. 4A and 4B are shown therein with common element numbers and will not be re-described herein.

In a non-limiting example, the ONU 438 includes a processing circuit 440, which can be an FPGA as an example, an ONU interface 442, and an equipment interface 444 (denoted as "I/F"). The equipment interface 444 may include circuits, sockets, connectors, and/or switches for connecting to the end equipment 436(1)-436(K). Notably, the equipment interface 444 can be a digital interface, an analog interface, or a combination thereof.

The processing circuit 440 may include a data buffer 446, which may be organized in the form of a First-in First-out (FIFO) queue, as an example. In this regard, the processing circuit 440 enqueues the non-periodic uplink data burst 414 in the data buffer 446. The processing circuit 440 may assemble the unsolicited BO report $R_{UBO}$ to report a depth of the data buffer 446 and generate the random access signal 434 that includes the unsolicited BO report $R_{UBO}$. In a non-limiting example, the processing circuit 440 can generate the random access signal 434 as soon as a first data packet in the non-periodic uplink data burst 414 is enqueued in the data buffer 446.

The ONU interface 442 is coupled to a respective one of the second optical fiber-based communications mediums 410(1)-410(N) to receive a respective one of the downlink optical communications signals 416D(1)-416D(N) from the passive optical splitter 404 and to provide a respective one of the uplink optical communications signals 416U(1)-416U(N) to the passive optical splitter 404. The ONU interface 442 can include an O/E converter(s) 448 and an E/O converter(s) 450. The O/E converter(s) 448 converts a respective one of the downlink optical communications signals 416D(1)-416D(N) to the downlink communications signal 424D. The E/O converter(s) 450 coverts the random access signal 434 into the optical random access signal 412. The E/O converter(s) 450 also coverts the uplink communications signal 424U into a respective one of the uplink optical communications signals 416U(1)-416U(N).

Notably, the random access signal 434 will only generate to solicit an initial uplink allocation $A_{UL}$ for sending, for example, the first data packet of the non-periodic uplink data burst 414. Once the processing circuit 440 receives the initial uplink allocation $A_{UL}$, the processing circuit 440 can generate subsequent BO reports $R_{BO}$ and piggy-back the subsequent BO reports $R_{BO}$ on the uplink communications signal 424U. For example, the processing circuit 440 can concurrently send the first data packet in the non-periodic uplink data burst 414 and request the uplink allocation $A_{UL}$ for the second data packet in the non-periodic data burst 414 in the uplink communications signal 424U. Accordingly, the control circuit 418 in the OLT 402 can provide another uplink allocation AUL for the second data packet in the non-periodic uplink data burst 414 in a subsequent downlink communications signal 424D.

With reference back to FIG. 4A, the protocol stack 430 receives the subsequent BO reports $R_{BO}$ from the uplink communications signal 424U and forwards the subsequent BO reports $R_{BO}$ to the scheduler 432. The scheduler 432 can generate subsequent uplink allocations $A_{UL}$ based on the subsequent BO reports $R_{BO}$ and provide the subsequent uplink allocations $A_{UL}$ to the protocol stack 430. The protocol stack 430, in turn, piggy-backs the subsequent uplink allocations $A_{UL}$ onto the downlink communications signal 424D.

Figure 6:
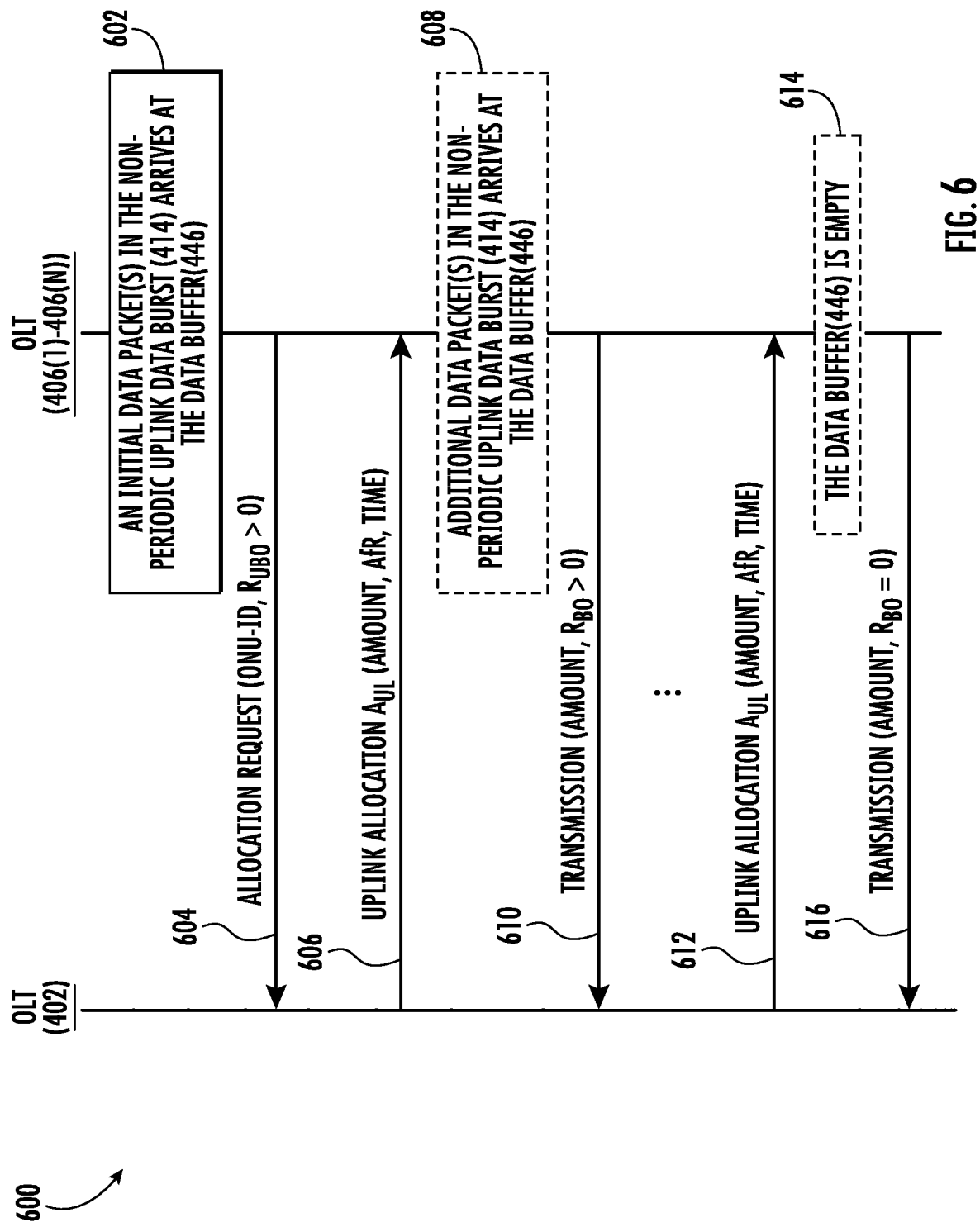
FIG. 6 provides an exemplary signal flow between an optical line terminator (OLT) and a number of ONUs in the optical communications network of FIG. 4A for supporting the wavelength-based uplink random access.

In summary, FIG. 6 provides an exemplary signal flow 600 between the OLT 402 and the ONUs 406(1)-406(N) in FIG. 4A for supporting the wavelength-based uplink random access. Common elements between FIGS. 4A, 4B, and 6 are shown therein with common element numbers and will not be re-described herein.

The signal flow 600 starts when an initial data packet(s) (e.g., first data packet) in the non-periodic uplink data burst 414 arrives at the data buffer 446 in any of the ONUs 406(1)-406(N) (step 602). Accordingly, any of the ONUs 406(1)-406(N) can generate the optical random access signal 412 to request the uplink allocation $A_{UL}$ (step 604). The optical random access signal 412 includes an ONU-ID and the unsolicited BO report $R_{UBO}$, which indicates a non-zero depth of the data buffer 446 ($R_{UBO}$>0). In response, the OLT 402 provides the uplink allocation $A_{UL}$ based on the unsolicited BO report $R_{UBO}$ in the downlink optical communications signal 416D (step 606). The uplink allocation $A_{UL}$ can include such information as amount of allocation (e.g., number of bytes), Ask for Report (AfR) indication, and time duration. In the meantime, additional data packet(s) (e.g., a second data packet) in the non-periodic uplink data burst 414 may have arrived at the data buffer 446 (step 608). Accordingly, any of the ONUs 406(1)-406(N) can transmit the initial data packet(s) in the non-periodic uplink data burst 414 and piggy-back the subsequent BO report $R_{BO}$, which indicates a non-zero depth of the data buffer 446 ($R_{BO}$>0), in the uplink optical communications signal 416U (step 610). The OLT 402, in turn, provides the subsequent UL allocation $A_{UL}$ based on the subsequent BO report $R_{BO}$ in the downlink optical communications signal (step 612). In a non-limiting example, the data buffer 446 becomes empty after the additional data packet(s) in the non-periodic uplink data burst 414 is dequeued for transmission (step 614). Accordingly, any of the ONUs 406(1)-406(N) can transmit the additional data packet(s) in the non-periodic uplink data burst 414 and piggy-back the subsequent BO report $R_{BO}$, which indicates a zero depth of the data buffer 446 ($R_{BO}$=0), in the uplink optical communications signal 416U (step 616). Accordingly, the OLT 402 will stop providing the uplink allocation $A_{UL}$ for the non-periodic uplink data burst 414.

With reference back to FIG. 4A, given that all of the ONUs 406(1)-406(N) can transmit the optical random access signal 412 based on the random access wavelength $\lambda_{RA}$, there may be a small but non-zero chance that two or more of the ONUs 406(1)-406(N) may attempt to transmit the optical random access signal 412 at the same time. In this regard, each of the ONUs 406(1)-406(N) can be configured to perform a contention procedure before providing the optical random access signal 412 to the OLT 402. Understandably, it may be difficult for the ONUs 406(1)-406(N) to perform a clear channel assessment (CCA) on the second optical fiber-based communications mediums 410(1)-410(N). In this regard, each of the ONUs 406(1)-406(N) can be configured to perform the contention procedure based on an ALOHA, slotted ALOHA protocol, or any other random retransmission protocol.

The wavelength-based BO reporting mechanism as enabled by the wavelength-based uplink random access can reduce initial access delay for transmitting the non-periodic uplink data burst 414 over a conventional polling-based BO reporting mechanism as described in FIG. 3B, as summarized in the table below.

|  | Polling-based BO Reporting | Wavelength-based BO Reporting |
|---|---|---|
| Example line rate | 10 Gbps | |
| Example Polling period | 125 microseconds | not relevant |
| Scheduling delay {min, max} | {0, 125} microseconds | ~50 nanoseconds |
| Average Scheduling delay | 62.5 microseconds | ~50 nanoseconds |
| {DL, UL} waste per ONU | {5 Mbps, 60 Mbps} | none |
| {DL, UL} waste per 32 ONU | {160 Mbps, 2 Gbps} | none |
| {DL, UL} waste per ONU | {0.5 Mbps, 9.3 Mbps} | none |
| {Dl, UL} waste per 32 ONU | {16 Mbps, 300 Mbps} | none |

Figure 7:
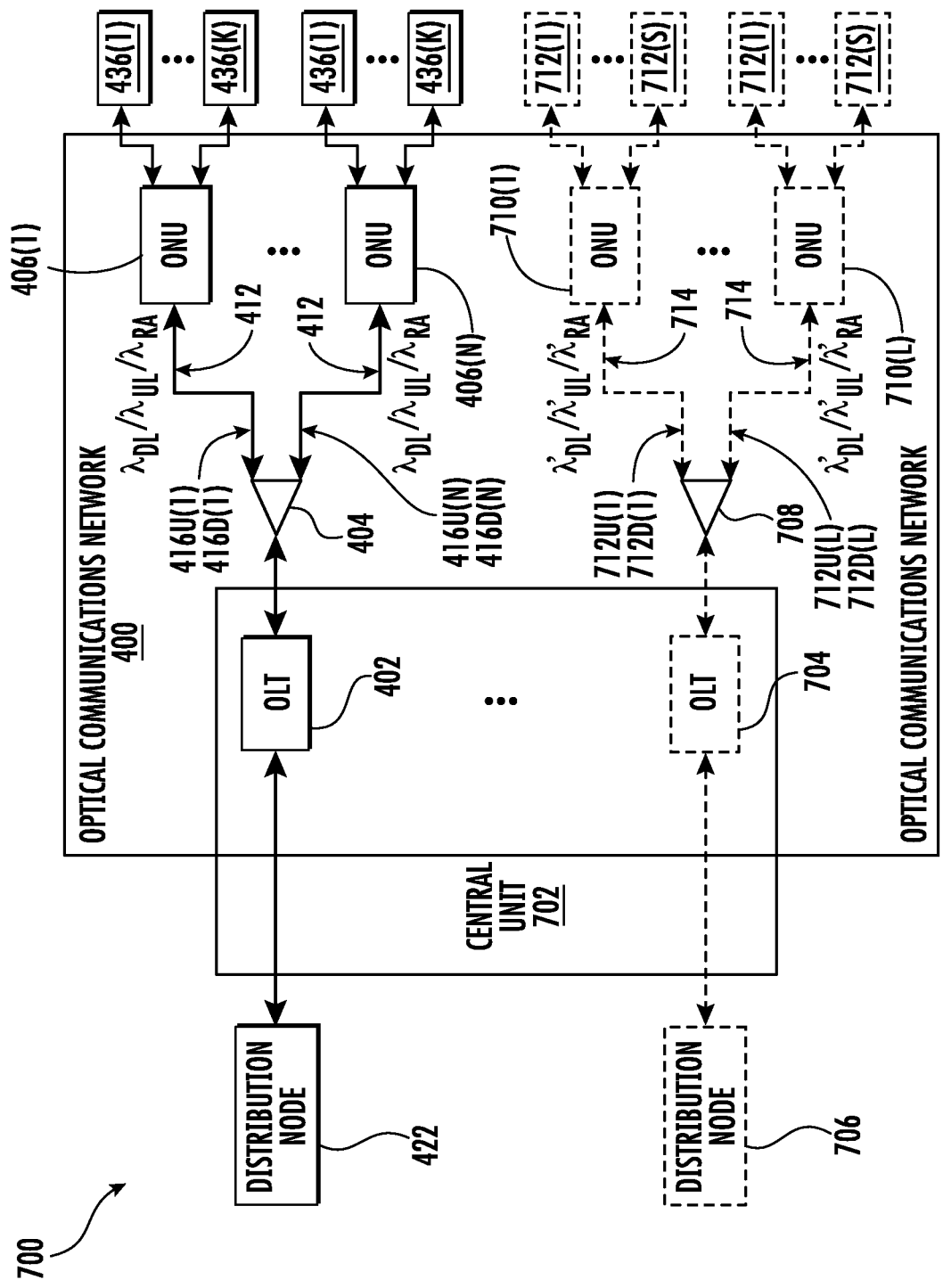
FIG. 7 is a WCS incorporating the optical communications network of FIG. 4A for supporting the wavelength-based uplink random access.

The optical communications network 400 can be provided in a variety of communications systems, including but not limited to a WCS, to support wavelength-based uplink random access. In this regard, FIG. 7 is a schematic diagram of an exemplary WCS 700 that includes the optical communications network 400 of FIG. 4A for supporting the wavelength-based uplink random access. Common elements between FIGS. 4A and 7 are shown therein with common element numbers and will not be re-described herein.

The WCS 700 includes a central unit 702 and the OLT 402 may be incorporated into the central unit 702. Accordingly, the end equipment 436(1)-436(K) associated with each of the ONUs 406(1)-406(N) can be remote units of the WCS 700.

The optical communications network 400 may include at least one second OLT 704 coupled to at least one second distribution node 706. Like the OLT 402, the second OLT 704 may be provided in the central unit 702 as well. The optical communications network 400 may also include at least one second passive optical splitter 708 coupled to the second OLT 704. The optical communications network 400 may also include a plurality of second ONUs 710(1)-710(L) coupled to the second passive optical slitter 708. The second OLT 704 and the second ONUs 710(1)-710(L) can be configured to support the wavelength-based uplink random access as described above in FIGS. 4A, 4B, 5, and 6. Like the ONUs 406(1)-406(N), each of the second ONUs 710(1)-710(L) is coupled to one or more second end equipment 712(1)-712(S). Similarly, the second end equipment 712(1)-712(S) can be remote units of the WCS 700.

The second ONUs 710(1)-710(L) can communicate a plurality of second downlink optical communications signals 712D(1)-712D(L) based on a second downlink wavelength $\lambda'_{DL}$ and a plurality of second uplink optical communications signals 712U(1)-712U(L) based on a second downlink wavelength $\lambda'_{UL}$. Each of the second ONUs 710(1)-710(L) can also communicate a second optical random access signal 714 to the second OLT 704 based on a second random access wavelength $\lambda'_{RA}$. Notably, the second random access wavelength $\lambda'_{RA}$ can be identical to or different from the random access wavelength $\lambda_{RA}$ used by the ONUs 406(1)-406(N) for communicating the optical random access signal 412.

Figure 8:
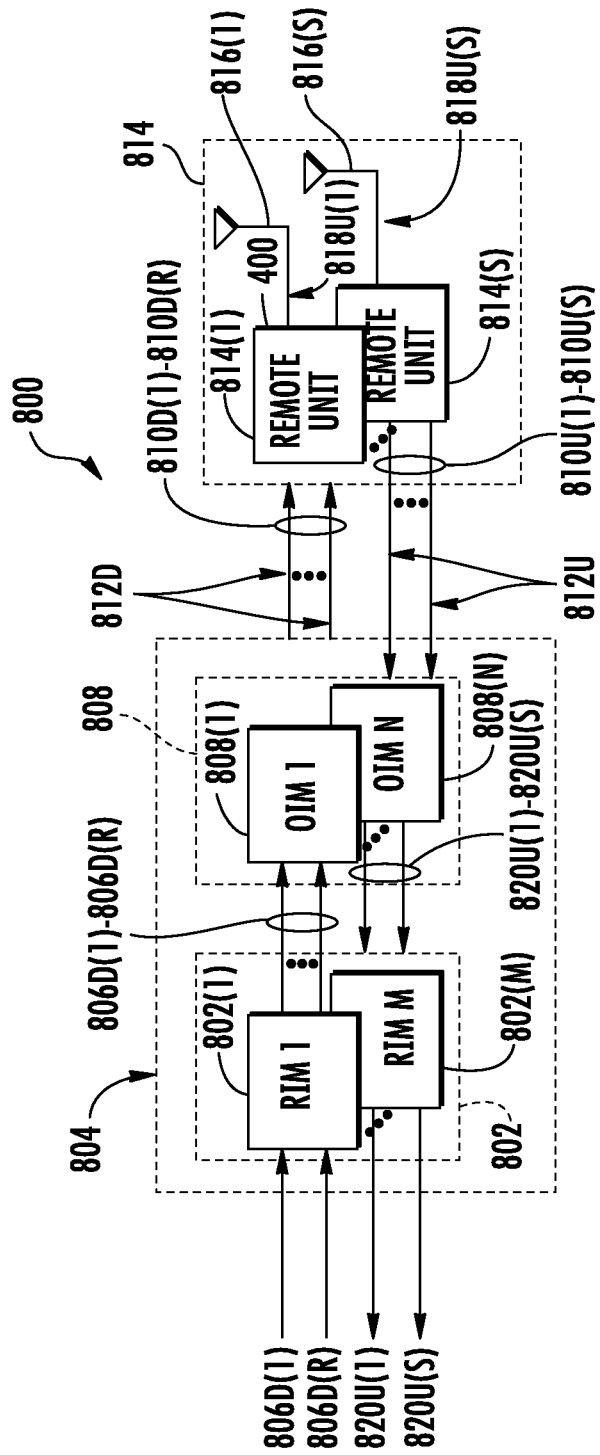
FIG. 8 is a schematic diagram of an exemplary WCS provided in the form of an optical fiber-based DAS that is configured to include the optical communications network of FIG. 4A or the WCS of FIG. 7.

FIG. 8 is a schematic diagram of an exemplary WCS 800 provided in the form of an optical fiber-based WCS that can include the optical communications network 400 of FIG. 4A or the WCS 700 of FIG. 7. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink communications signals 806D(1)-806D(R) prior to optical conversion into downlink optical fiber-based communications signals. The downlink communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each of the RIMs 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMs 802(1)-802(M), the central unit 804 could be configured to support and distribute communications signals on both PCS and Long-Term Evolution (LTE) 700 radio bands, as an example. The RIMs 802(1)-802(M) may be provided in the central unit 804 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 802(1)-802(M) may also be provided in the central unit 804 that supports any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink communications signals 806D(1)-806D(R) are provided to a plurality of optical interfaces provided in the form of optical interface modules (OIMs) 808(1)-808(N) in this embodiment to convert the downlink communications signals 806D(1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). The notation "1-S" indicates that any number of the referenced component 1-S may be provided. Remote unit O/E converters provided in the remote units 814(1)-814(S) convert the downlink optical fiber-based communications signals 810D(1)-810D(R) back into the downlink communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink communications signals 818U(1)-818U(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium. In a non-limiting example, the OIMs 808(1)-808(N), the downlink optical fiber-based communications medium 812D, and the uplink optical fiber-based communications medium 812U can be configured to collectively form the optical communications network 400 of FIG. 4A.

Figure 9:
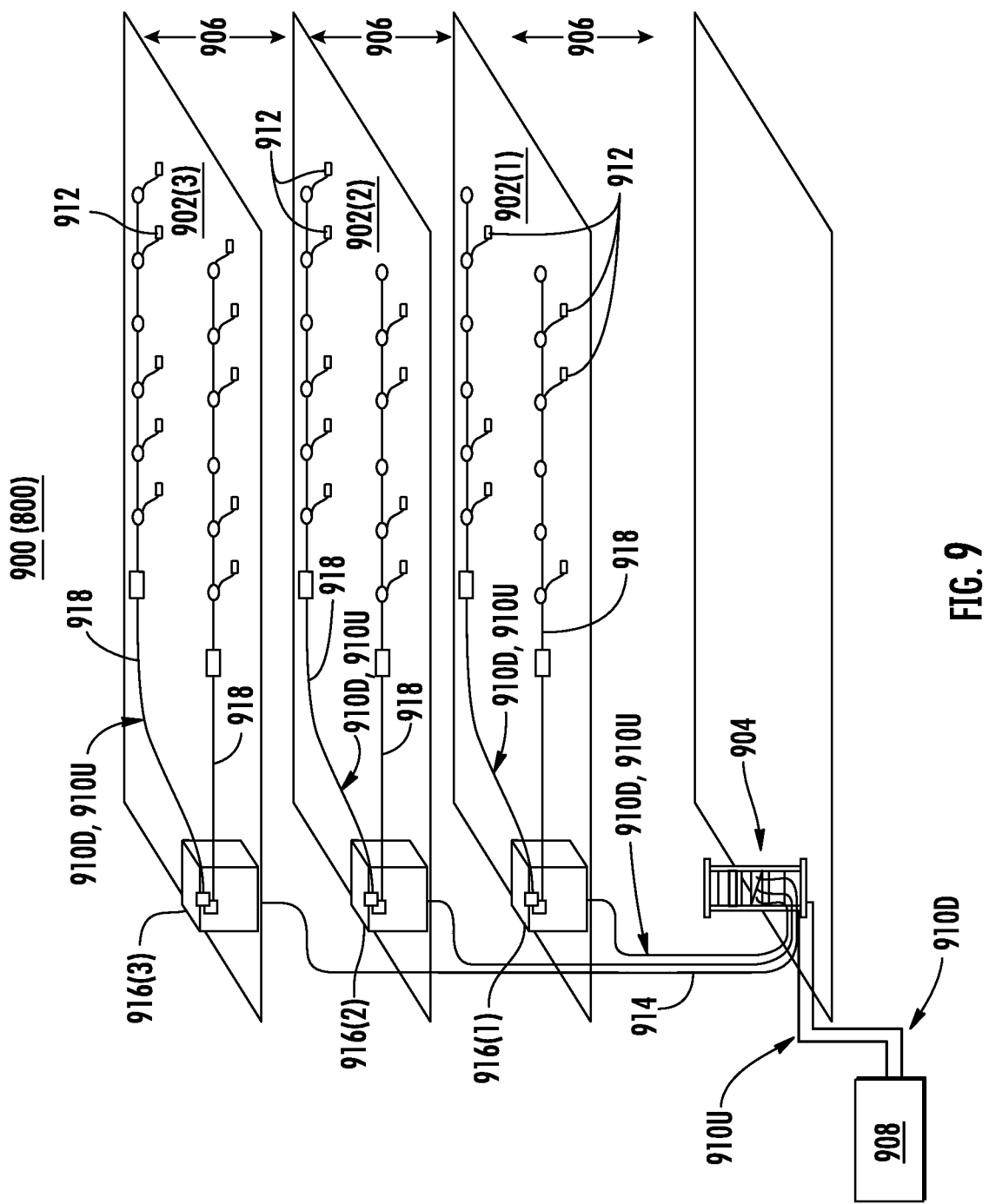
FIG. 9 is a schematic diagram of an exemplary building infrastructure with a deployed DCS, such as the optical fiber-based DAS in FIG. 8.

The WCS 800 in FIG. 8 can be provided in an indoor environment as illustrated in FIG. 9. FIG. 9 is a partial schematic cut-away diagram of an exemplary building infrastructure 900 in a WCS, such as the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
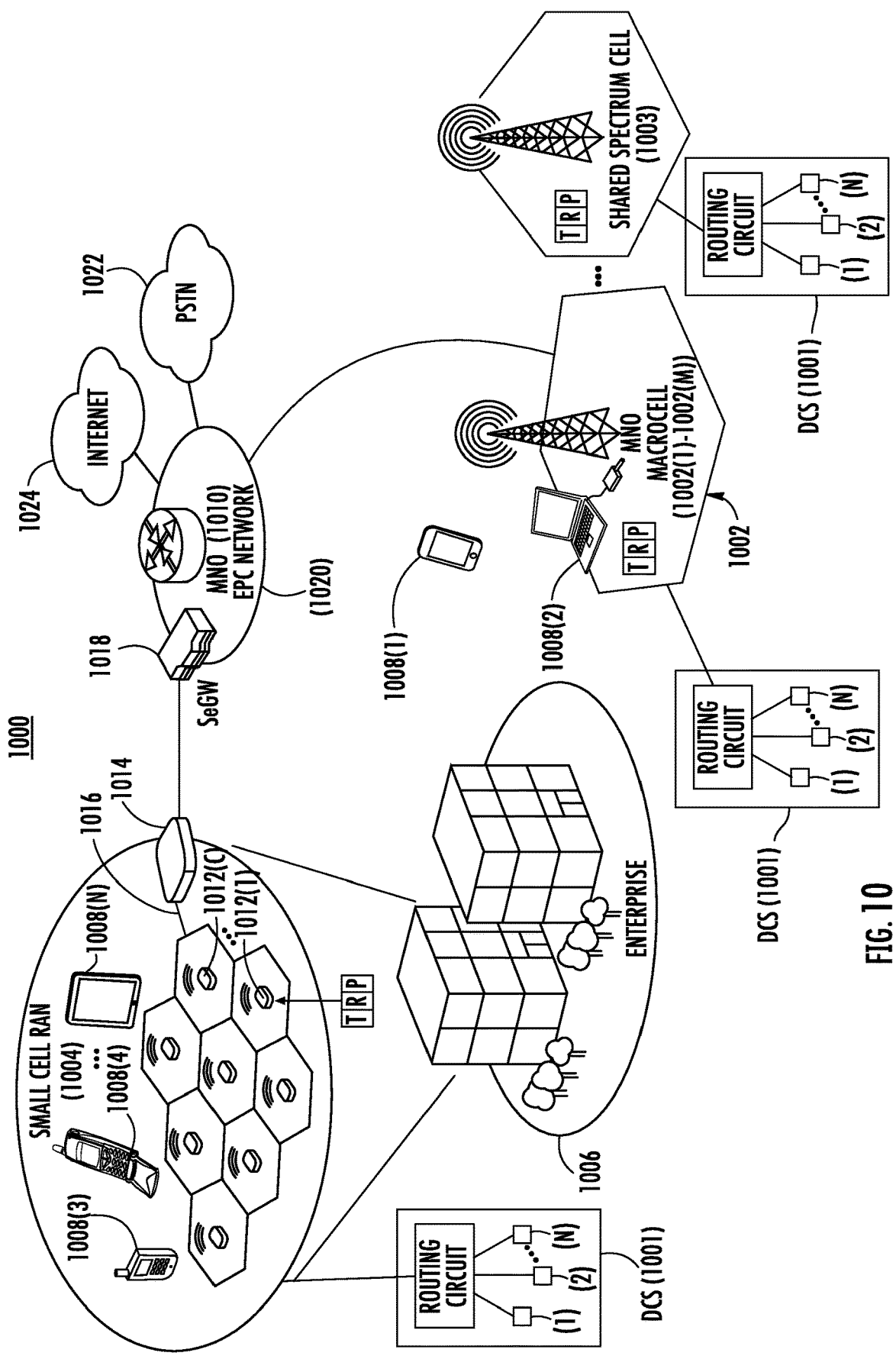
FIG. 10 is a schematic diagram of an exemplary mobile telecommunications environment that includes the WCS of FIG. 7.

The WCS 700 of FIG. 7, which includes the optical communications network 400 of FIG. 4A configured to support wavelength-based uplink random access can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum DCSs 1001 supporting coordination of distribution of shared spectrum from multiple service providers to remote units to be distributed to subscriber devices. The shared spectrum DCSs 1001 can include the WCS 700 of FIG. 7 as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between user mobile communications devices 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that the user mobile communications devices 1008(3)-1008(N) may be able to be in communications range of two or more of the MNO macrocell 1002, the shared spectrum cell 1003, and the small cell RAN 1004 depending on the location of user mobile communications devices 1008(3)-1008(N).

In FIG. 10, the mobile telecommunications environment 1000 in this example is arranged as a Long Term Evolution (LTE) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
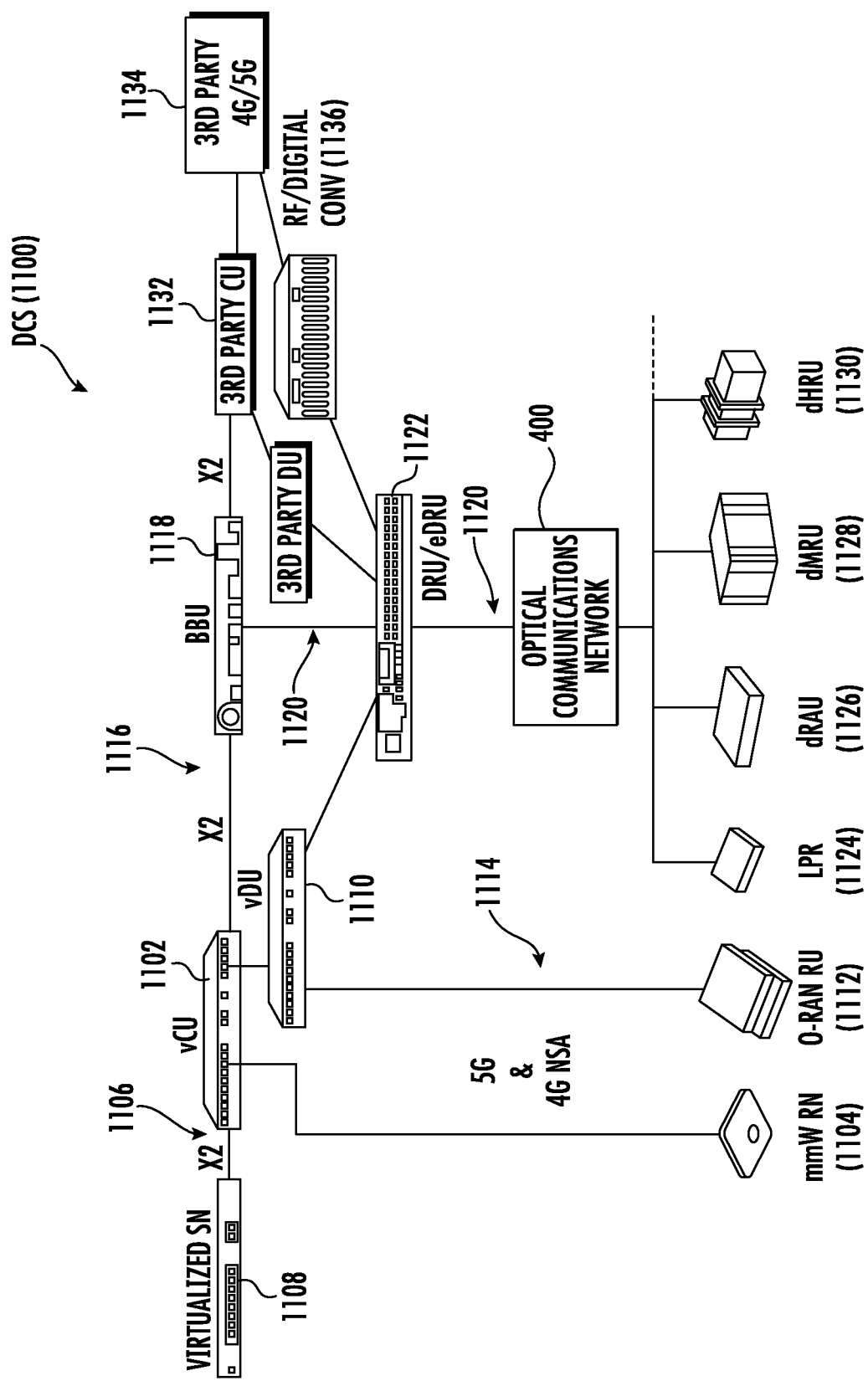
FIG. 11 is a schematic diagram of an exemplary distributed communications system that supports fourth generation (4G) and fifth generation (5G) communications services, and wherein any of the radio nodes can be configured to perform RF-based ranging and imaging in the wireless communications cell.

FIG. 11 is a schematic diagram of another exemplary DCS 1100 that supports 4G and 5G communications services, and wherein any of the radio nodes can be configured to provide feedbackless interference estimation and suppression, according to any of the embodiments herein. The DCS 1100 supports both legacy 4G LTE, 4G/5G non-standalone (NSA), and 5G communications systems. As shown in FIG. 11, a centralized services node 1102 is provided that is configured to interface with a core network to exchange communications data and distribute the communications data as radio signals to remote units. In this example, the centralized services node 1102 is configured to support distributed communications services to a millimeter wave (mmW) radio node 1104. The functions of the centralized services node 1102 can be virtualized through an x2 interface 1106 to another services node 1108. The centralized services node 1102 can also include one or more internal radio nodes that are configured to be interfaced with a distribution node 1110 to distribute communications signals for the radio nodes to an open RAN (O-RAN) remote unit 1112 that is configured to be communicatively coupled through an O-RAN interface 1114.

The centralized services node 1102 can also be interfaced through an x2 interface 1116 to a baseband unit (BBU) 1118 that can provide a digital signal source to the centralized services node 1102. The BBU 1118 is configured to provide a signal source to the centralized services node 1102 to provide radio source signals 1120 to the O-RAN remote unit 1112 as well as to a distributed router unit (DRU) 1122 as part of a digital DAS. The DRU 1122 is configured to split and distribute the radio source signals 1120 to different types of remote units, including a lower power remote unit (LPR) 1124, a radio antenna unit (dRAU) 1126, a mid-power remote unit (dMRU) 1128, and a high power remote unit (dHRU) 1130. The BBU 1118 is also configured to interface with a third party central unit 1132 and/or an analog source 1134 through an RF/digital converter 1136. In a non-limiting example, the DRU 1122 can be coupled to the LPR 1124, the dRAU 1126, the dMRU 1128, and the dHRU 1130 via the optical communications network 400 of FIG. 4A, which is configured to support the wavelength-based uplink random access. In addition, the optical communications network 400 may also be used to enable links between the centralized services node 1102 and the distribution node 1110, between the centralized services node 1102 and the mmW radio node 1104, between the BBU 1118 and the DRU 1122, between the third party central unit 1132 and the DRU 1122, and between the distribution node 1110 and the DRU 1122.

Figure 12:
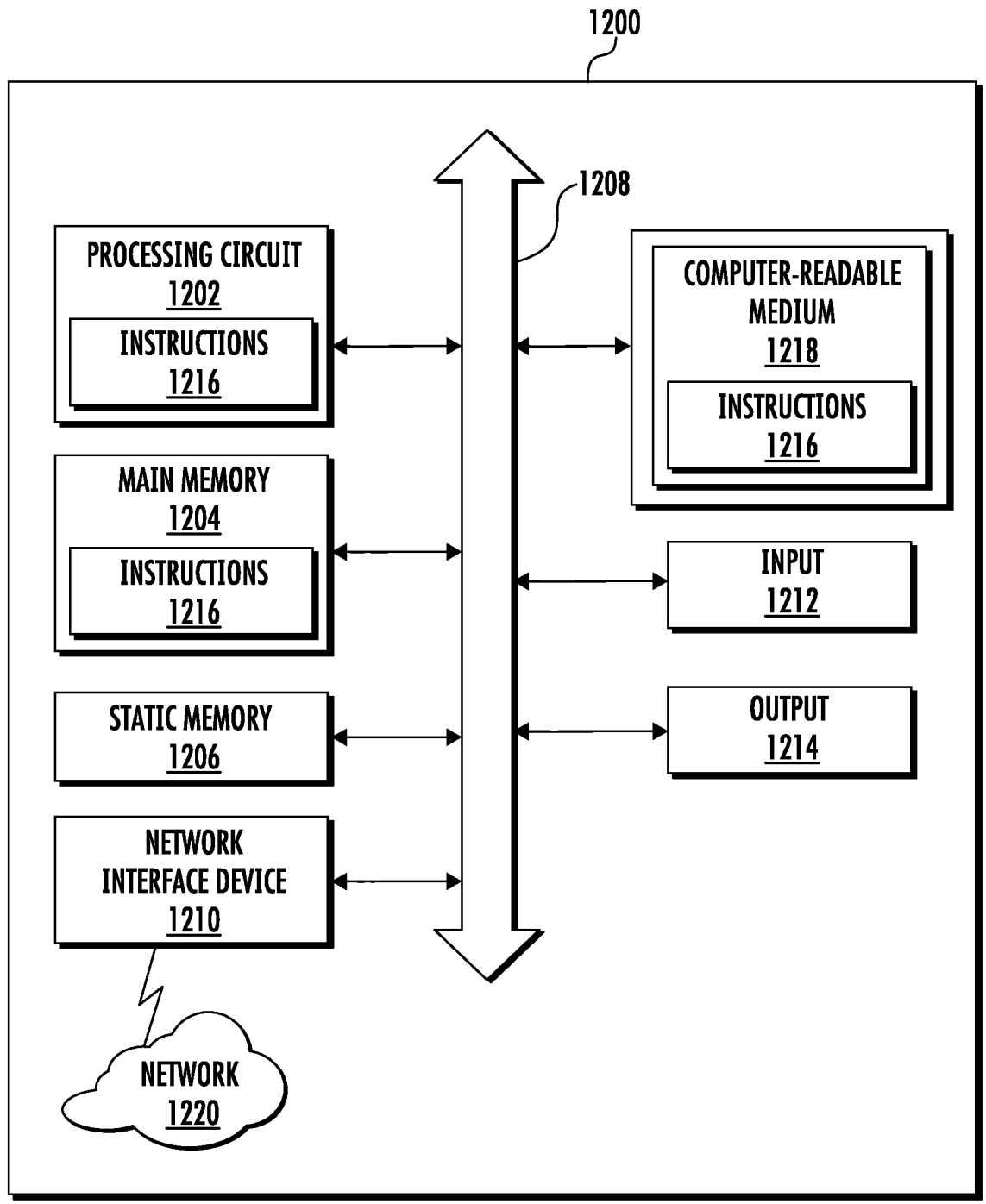
FIG. 12 is a schematic diagram of a representation of an exemplary computer system that can be included in or interface with any of the components in the optical communications network in FIG. 4A, the ONU in FIG. 4B, and the WCS of FIG. 7, wherein the exemplary computer system is configured to execute instructions from an exemplary computer-readable medium.

Any of the circuits in the optical communications network 400 of FIG. 4A, the ONU 438 of FIG. 4B, and the WCS 700 of FIG. 7 can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. An optical communications network, comprising:
   an optical line terminator (OLT) configured to:
      communicate a downlink optical communications signal based on a downlink wavelength; and
      communicate an uplink optical communications signal based on an uplink wavelength different from the downlink wavelength; and
   a plurality of optical network units (ONUs) coupled to the OLT, wherein at least one ONU among the plurality of ONUs comprises:
      a processing circuit configured to generate a random access signal comprising an unsolicited buffer occupancy (BO) report in response to receiving a non-periodic uplink data burst; and
      an ONU interface configured to:
         convert the random access signal into an optical random access signal comprising the unsolicited BO report; and
         provide the optical random access signal to the OLT based on a random access wavelength different from the downlink wavelength and the uplink wavelength.

2. The optical communications network of claim 1, wherein the processing circuit in the at least one ONU is further configured to generate the random access signal in response to receiving a first data packet in the non-periodic uplink data burst.

3. The optical communications network of claim 1, further comprising a passive optical splitter coupled between the OLT and the plurality of ONUs, the passive optical splitter configured to:

split the downlink optical communications signal into a plurality of downlink optical communications signals; and combine a plurality of uplink optical communications signals and the optical random access signal from the at least one ONU into the uplink optical communications signal;

wherein the ONU interface in the at least one ONU is further configured to:

receive a respective one of the plurality of downlink optical communications signals from the passive optical splitter based on the downlink wavelength; and provide a respective one of the plurality of uplink optical communications signals and the optical random access signal to the passive optical splitter based on the uplink wavelength.

4. The optical communications network of claim 3, wherein the OLT comprises:

a control circuit coupled to a distribution node and configured to:

receive a downlink communications signal from the distribution node; and provide an uplink communications signal to the distribution node; and an OLT interface coupled between the control circuit and the passive optical splitter, the OLT interface configured to:

convert the downlink communications signal into the downlink optical communications signal;

convert the uplink optical communications signal into the uplink communications signal; and convert the optical random access signal into the random access signal.

5. The optical communications network of claim 4, wherein:

the control circuit is further configured to:

receive the random access signal from the OLT interface;

determine an uplink allocation for the at least one ONU based on the unsolicited BO report comprised in the random access signal; and piggy-back the uplink allocation on the downlink communications signal;

the OLT interface is further configured to convert the downlink communications signal into the downlink optical communications signal comprising the uplink allocation; and the passive optical splitter is further configured to split the downlink optical communications signal into the plurality of downlink optical communications signals each comprising the uplink allocation.

6. The optical communications network of claim 5, wherein in the at least one ONU:

the ONU interface is further configured to convert the respective one of the plurality of downlink optical communications signals into the downlink communications signal comprising the uplink allocation;

the processing circuit is further configured to:

retrieve the uplink allocation from the downlink communications signal; and generate the uplink communications signal comprising the non-periodic uplink data burst based on the uplink allocation; and the ONU interface is further configured to convert the uplink communications signal into a respective one of the plurality of uplink optical communications signals comprising the non-periodic uplink data burst.

7. The optical communications network of claim 1, wherein the at least one ONU is configured to provide the optical random access signal to the OLT without receiving a polling signal from the OLT.

8. The optical communications network of claim 1, wherein the at least one ONU is configured to perform a contention procedure before providing the optical random access signal to the OLT.

9. The optical communications network of claim 8, wherein the at least one ONU is further configured to perform the contention procedure based on a protocol selected from the group consisting of: an ALOHA protocol; and a slotted ALOHA protocol.

10. The optical communications network of claim 1, configured to operate as a passive optical network (PON).

11. A method for supporting wavelength-based uplink random access in an optical communications network for a wireless communications system (WCS), comprising:

generating an optical random access signal comprising an unsolicited buffer occupancy (BO) report in response to receiving a non-periodic uplink data burst; and providing the optical random access signal to an optical line terminator (OLT) based on a random access wavelength different from a downlink wavelength for receiving a downlink optical communications signal from the OLT and an uplink wavelength for providing an uplink optical communications signal to the OLT.

12. The method of claim 11, further comprising providing the optical random access signal to the OLT in response to receiving a first data packet in the non-periodic uplink data burst.

13. The method of claim 11, further comprising:

receiving an uplink allocation from the OLT; and providing the non-periodic uplink data burst to the OLT in the uplink allocation.

14. The method of claim 11, further comprising providing the optical random access signal to the OLT without receiving a polling signal from the OLT.

15. The method of claim 11, further comprising performing a contention procedure before providing the optical random access signal to the OLT.

16. The method of claim 15, further comprising performing the contention procedure based on a protocol selected from the group consisting of: an ALOHA protocol; and a slotted ALOHA protocol.

17. A wireless communications system (WCS), comprising:

an optical communications network, comprising:

an optical line terminator (OLT) configured to:

communicate a downlink optical communications signal based on a downlink wavelength; and communicate an uplink optical communications signal based on an uplink wavelength different from the downlink wavelength; and a plurality of optical network units (ONUs) coupled to the OLT, wherein at least one ONU among the plurality of ONUs comprises:

a processing circuit configured to generate a random access signal comprising an unsolicited buffer occupancy (BO) report in response to receiving a non-periodic uplink data burst; and an ONU interface configured to:

convert the random access signal into an optical random access signal comprising the unsolicited BO report; and provide the optical random access signal to the OLT based on a random access wavelength different from the downlink wavelength and the uplink wavelength.

18. The WCS of claim 17, wherein the processing circuit in the at least one ONU is further configured to generate the random access signal in response to receiving a first data packet in the non-periodic uplink data burst.

19. The WCS of claim 17, further comprising a central unit comprising the OLT.

20. The WCS of claim 17, wherein the optical communications network further comprises a passive optical splitter coupled between the OLT and the plurality of ONUs, the passive optical splitter configured to:
   split the downlink optical communications signal and the optical random access signal from the at least one ONU into a plurality of downlink optical communications signals; and
   combine a plurality of uplink optical communications signals into the uplink optical communications signal;
   wherein the ONU interface in the at least one ONU is further configured to:
      receive a respective one of the plurality of downlink optical communications signals from the passive optical splitter based on the downlink wavelength; and
      provide a respective one of the plurality of uplink optical communications signals and the optical random access signal to the passive optical splitter based on the uplink wavelength.

21. The WCS of claim 20, wherein the OLT comprises:
   a control circuit coupled to a distribution node and configured to:
      receive a downlink communications signal from the distribution node; and
      provide an uplink communications signal to the distribution node; and
   an OLT interface coupled between the control circuit and the passive optical splitter, the OLT interface configured to:
      convert the downlink communications signal into the downlink optical communications signal;
      convert the uplink optical communications signal into the uplink communications signal; and
      convert the optical random access signal into the random access signal.

22. The WCS of claim 21, further comprising the distribution node, wherein the distribution node is configured to communicate the downlink communications signal and receive the uplink communications signal based on common public radio interface (CPRI) protocol.

23. The WCS of claim 21, further comprising a plurality of remote units, wherein:
   each of the plurality of ONUs is coupled to one or more of the plurality of remote units each configured to:
      receive the downlink communications signal from a respective one of the plurality of ONUs; and
      provide the uplink communications signal to the respective one of the plurality of ONUs; and
   at least one of the plurality of remote units is configured to generate and provide the non-periodic uplink data burst to the processing circuit in the at least one ONU.

24. The WCS of claim 21, wherein:
   the control circuit is further configured to:
      receive the random access signal from the OLT interface;
      determine an uplink allocation for the at least one ONU based on the unsolicited BO report comprised in the random access signal; and
   piggy-back the uplink allocation on the downlink communications signal;
   the OLT interface is further configured to convert the downlink communications signal into the downlink optical communications signal comprising the uplink allocation; and
   the passive optical splitter is further configured to split the downlink optical communications signal into the plurality of downlink optical communications signals each comprising the uplink allocation.

25. The WCS of claim 24, wherein in the at least one ONU:
   the ONU interface is further configured to convert the respective one of the plurality of downlink optical communications signals into the downlink communications signal comprising the uplink allocation;
   the processing circuit is further configured to:
      retrieve the uplink allocation from the downlink communications signal; and
      generate the uplink communications signal comprising the non-periodic uplink data burst based on the uplink allocation; and
   the ONU interface is further configured to convert the uplink communications signal into a respective one of the plurality of uplink optical communications signals comprising the non-periodic uplink data burst.

26. The WCS of claim 17, wherein the at least one ONU is configured to provide the optical random access signal to the OLT without receiving a polling signal from the OLT.

27. The WCS of claim 17, wherein the at least one ONU is configured to perform a contention procedure before providing the optical random access signal to the OLT.

28. The WCS of claim 27, wherein the at least one ONU is further configured to perform the contention procedure based on a protocol selected from the group consisting of: an ALOHA protocol; and a slotted ALOHA protocol.

29. The WCS of claim 17, wherein the optical communications network is a passive optical network (PON).

30. The WCS of claim 17, wherein the optical communications network further comprises:
   at least one second OLT;
   at least one second passive optical splitter coupled to the at least one second OLT; and
   a plurality of second ONUs coupled to the at least one second passive optical splitter, wherein at least one of the plurality of second ONUs is configured to communicate a second optical random access signal based on a second random access wavelength that is identical to or different from the random access wavelength.

* * * * *

UNITED STATES PATENT AND TRADEMARK OFFICE
CERTIFICATE OF CORRECTION

PATENT NO. : 10,979,789 B1
APPLICATION NO. : 16/901135
DATED : April 13, 2021
INVENTOR(S) : Baruh Hason It is certified that error appears in the above-identified patent and that said Letters Patent is hereby corrected as shown below:

In the Claims

In Column 23, Line 53, Claim 23, delete "WC S" and insert -- WCS --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*